W. L. BURNER.
DUMP CAR.
APPLICATION FILED MAY 15, 1916.

1,236,368. Patented Aug. 7, 1917.

WITNESSES:
James D. Benbow

William L. Burner
INVENTOR.
BY
Geo. W. Rightmyer
ATTORNEYS.

UNITED STATES PATENT OFFICE.

WILLIAM L. BURNER, OF COLUMBUS, OHIO, ASSIGNOR TO THE KILBOURNE AND JACOBS MANUFACTURING COMPANY, OF COLUMBUS, OHIO, A CORPORATION OF OHIO.

DUMP-CAR.

1,236,368. Specification of Letters Patent. Patented Aug. 7, 1917.

Application filed May 15, 1916. Serial No. 97,607.

*To all whom it may concern:*

Be it known that I, WILLIAM L. BURNER, a citizen of the United States, residing at Columbus, in the county of Franklin and State of Ohio, have invented certain new and useful Improvements in Dump-Cars, of which the following is a specification.

My invention relates to a dumping car having a bed adapted to tilt in either direction for dumping; chains are usually provided to hold the car bed in normal position, but I dispense with them and provide in their stead a lock arm so constructed as to fold inwardly on the side of the car toward which the dumping takes place, and the lock arm on the other side will meanwhile remain extended. The purpose of the lock arm is to maintain the car bed in normal horizontal position, to fold out of the way to permit dumping, and to assume extended position when the car bed is again righted; the arm gives greater rigidity and support to the car bed than is possible by the use of chains.

Figure 1:
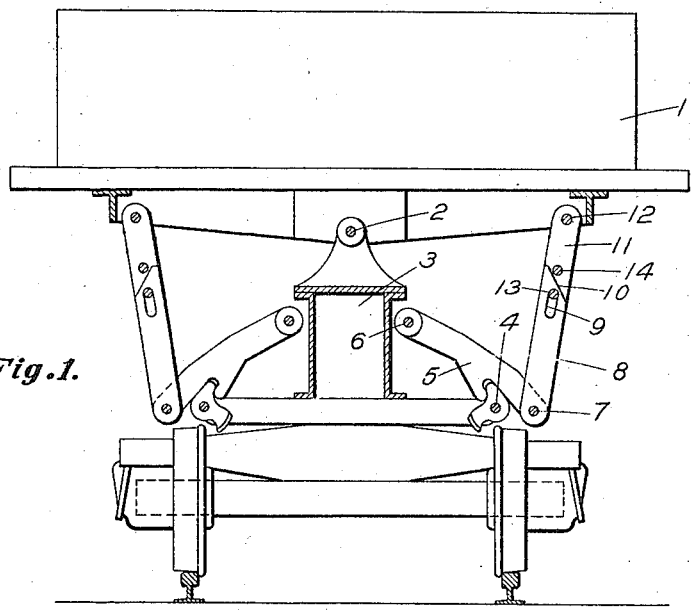
Figure 2:
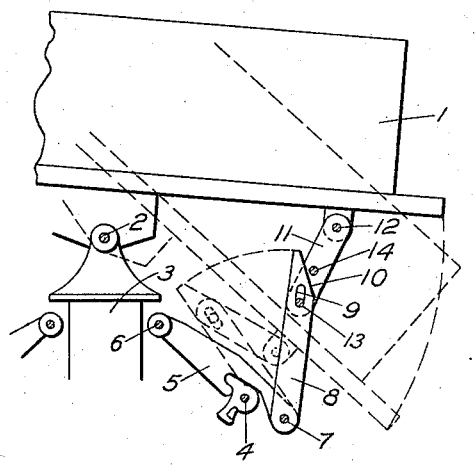
Figure 3:
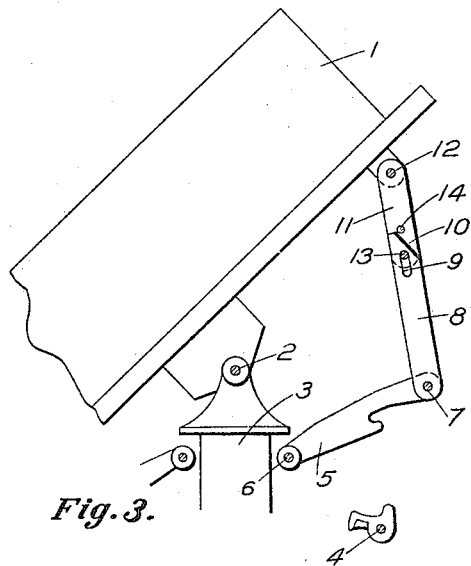

In the drawings hereto attached and made part of this specification, Figure 1 is a transverse section view of a car from the end, having my improved lock arm thereon; Fig. 2 is a transverse section view from the same point showing the car bed in its dumped position, and illustrating the movement of the locking arm as the car bed is tilting toward its dumped position; Fig. 3 is a transverse sectional view showing the position of the lock arm on the side of the car bed which is elevated in the dumping operation.

Referring to the drawings, 1 is the car bed mounted pivotally at 2 on the underframe to tilt in both directions; a dog or latch 4 is mounted on the underframe and appropriately operated to engage the locking bar 5 pivotally mounted on the underframe 3 at 6; pivotally associated at 7 with the locking bar 5 is a member 8 of the lock arm, provided with the slot 9 and cut away at its upper or free end to form the inclined face 10. The member 11 of the lock arm is pivotally mounted at 12 on the car bed 1, and carries the pin 13 to engage the slot 9 and the pin 14 to engage the inclined face 10.

Assume that the car bed is to be dumped as illustrated in Fig. 2; the dog 4 and the locking bar 5 remain in engagement, the pin 13 travels down the slot 9, the pin 14 travels along the inclined face 10 thereby forcing the member 8 inwardly and also thereby carrying the member 11 inwardly until the maximum position is reached as shown in the dotted lines in Fig. 2. The construction provided assures the inward folding of the lock arm and renders it impossible to fold in any other direction; this is a safety precaution which is highly desirable. By my improvement therefore I obtain the necessary flexibility for ready operation of the car in dumping and righting and also provide a firm and substantial means for maintaining the car bed securely in its normal position when loaded and when being moved empty. In the righting movement the pin 13 is retracted to the upper end of the slot 9, and the pin 14 travels back along the face 10 and returns to its upper position as shown in Fig. 1. The operation on the other side of the car will be readily understood from the drawings and the description above given for one side of the car is sufficient.

What I claim is:—

1. In a side dumping car having a car bed and a lock mounted on the underframe, an arm associated with said car bed, a second arm associated with said lock, one of said arms having a slot and having its free end cut away to provide an inclined face, a pin on said other arm to engage said slot and a second pin thereon adapted to engage said face to cause said arms to fold inwardly when the car bed is appropriately dumped.

2. In a side dumping car having a bed and a lock mounted on the underframe, a lock arm associated with said car bed, a second arm associated with said lock having a slot near its upper end, means carried by said first arm to engage in said slot, and means adapted to engage said second arm to cause said arms to fold inwardly when said car bed is appropriately dumped.

In testimony whereof I affix my signature in the presence of two witnesses.

WILLIAM L. BURNER.

Witnesses:
J. D. BENBOW,
J. C. STONE.

Copies of this patent may be obtained for five cents each, by addressing the "Commissioner of Patents, Washington, D. C."